(12) United States Patent
Evelin et al.

(10) Patent No.: US 8,043,585 B2
(45) Date of Patent: Oct. 25, 2011

(54) LIQUID AND SOLID EFFLUENT TREATMENT PROCESS

(75) Inventors: Salomao Solino Evelin, Belo Horizonte (BR); Roberto Mattioli Silva, Araxa (BR)

(73) Assignee: Vale Inco Limited, Toronto (CA)

( * ) Notice: Subject to any disclaimer, the term of this patent is extended or adjusted under 35 U.S.C. 154(b) by 126 days.

(21) Appl. No.: 12/351,058

(22) Filed: Jan. 9, 2009

(65) Prior Publication Data

US 2009/0180945 A1   Jul. 16, 2009

Related U.S. Application Data

(60) Provisional application No. 61/021,147, filed on Jan. 15, 2008.

(51) Int. Cl.
*C01G 1/00* (2006.01)
(52) U.S. Cl. ......... 423/143; 429/138; 429/140; 429/146
(58) Field of Classification Search .................. 423/385, 423/143, 145, 138, 140, 146
See application file for complete search history.

(56) References Cited

U.S. PATENT DOCUMENTS

| | | | | |
|---|---|---|---|---|
| 2,145,816 A | * | 1/1939 | Stoops ........................ | 423/104 |
| 3,468,624 A | * | 9/1969 | Miller et al. ................. | 423/545 |
| 3,595,610 A | * | 7/1971 | Brinkman et al. ............ | 423/307 |
| 4,152,196 A | * | 5/1979 | Buhlmann .................... | 159/16.3 |
| 6,861,041 B2 | | 3/2005 | Hyvrard et al. ............... | 423/555 |
| 7,387,767 B2 | * | 6/2008 | Campbell et al. ............. | 423/141 |
| 7,553,462 B2 | * | 6/2009 | Feldmann et al. ............ | 423/164 |

FOREIGN PATENT DOCUMENTS

GB      1346524      10/1972

* cited by examiner

*Primary Examiner* — Melvin Mayes
(74) *Attorney, Agent, or Firm* — Arent Fox, LLP

(57) ABSTRACT

A process for recovering metals such as Ni, Co, Mn, Cu, Zn, among others, through precipitation as sulphides, enabling recovery of magnesium in the form of hydroxide, carbonate and oxide and providing recovery of sulphate as gypsum and ammonium sulphate. Liquid phase, after full treatment, comprises recovered water with a quality proper for total reuse in industrial process.

This process of liquid and solid effluent treatment is provided with flexibility to process several types of effluents presenting wide variations in their chemical composition. The main steps of this process are: (1) equalization of liquid effluent, (2) precipitation of metals as sulphides, (3) oxidation of metallic sulphides and crystallization as metallic sulphates, (4) precipitation of magnesium as hydroxide and calcination thereof into magnesium oxide (5) recovery of ammonia, (6) preconcentration of the remaining saline solution, (7) evaporation/ crystallization of ammonium sulphate, (8) storage of recovered water, (9) partial or total precipitation of sulphate contained in the effluent with quicklime, (10) segregated storage of gypsum and gypsum-magnesium mixture, (11) softening of the remaining solution and (12) storage of softening water.

26 Claims, 3 Drawing Sheets

PRIOR ART

LIQUID AND SOLID EFFLUENT TREATMENT PROCESS

RELATED APPLICATION

This application claims priority from U.S. provisional patent application 61021147 which was filed on Jan. 15, 2008.

BACKGROUND OF THE INVENTION

The present invention refers to a process for treatment of liquid and solid effluents allowing recovering metals through precipitation of co-sulphide, enabling magnesium recovery and providing sulphate recovery as gypsum and ammonium sulphate.

The main objectives of any method for treatment of liquid and solid effluent are (i) neutralize and fit them in a proper manner to be launched and returned to environment and (ii) obtain recyclable byproducts to be reused in the manner of a captive consumption and/or via commercialization to third parties.

In utilization of lateritic and nickeliferous ores, several factors affect nickel production process by hydrometallurgical route and high pressure acid leaching (HPAL), namely:
  Geological origin of beds;
  Ore mineralogical composition;
  Ore granulometric distribution;
  Processing operation conditions;
  Configuration of ore preparation, leaching, precipitation, solvent extraction and electro-refining systems.

High pressure acid leaching (HPAL) is recommended for predominantly limonitic ores presenting low contents of magnesium—usually limited to 4% at most—once ores bearing high contents of magnesium present a high consumption of sulphuric acid.

Processes used to produce nickel by known routes, such as HPAL, as illustrated in FIG. 1, essentially comprises the following steps: (i) preparation of nickel lateritic ore, (ii) nickel leaching under pressure with sulphuric acid, (iii) nickel precipitation, (iv) re-leaching, (v) nickel solvent-extraction and (vi) electro-refining for production of cathode nickel (metallic nickel with 99.95% purity). In view of the significant presence of cobalt in ore, the same is will be obtained as a coproduct, also in metallic form.

This technology is the most indicated process to extract nickel and cobalt from limonitic laterites due to the following advantages:
  limonitic laterites present low magnesium contents and, therefore, a low consumption of sulphuric acid;
  Low operating cost due to low cost of sulphuric acid and low specific consumption thereof;
  No drying or reduction stage is required, as raw laterite (Run Of Mine—ROM) is used in suspension form;
  High selectivity to relevant metals;
  Sulphur dioxide emissions below environmental standards;
  Recovery rates above 90% for nickel and cobalt contained in the ore.

Leaching under pressure is usually performed in titanium-coated autoclaves, in temperatures ranging from 463 to 518° F. (245 to 270° C.). In this process, autoclave feed suspension contains approximately 40-45% solids, when previously heated with steam. In some ores, due to nature of argillaceous ore which are present, this concentration may be limited up to 25% to 30%. Thickening level of the suspension has a significant influence in autoclave capacity, which constitutes an equipment with a high capital cost. Leaching mechanism involves acid dissolution in high temperature of nickel and cobalt contained in the host ore matrix. In these conditions, iron dissolution of these ores occur, followed by formation of sulphates, which in high temperature conditions react with water to form hematite, thereby regenerating sulphuric acid:

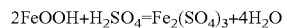

$2FeOOH + H_2SO_4 = Fe_2(SO_4)_3 + 4H_2O$

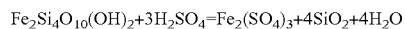

$Fe_2Si_4O_{10}(OH)_2 + 3H_2SO_4 = Fe_2(SO_4)_3 + 4SiO_2 + 4H_2O$

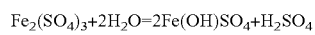

$Fe_2(SO_4)_3 + 2H_2O = 2Fe(OH)SO_4 + H_2SO_4$

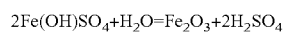

$2Fe(OH)SO_4 + H_2O = Fe_2O_3 + 2H_2SO_4$

Extraction levels of this process reach values from 92% to 96% for nickel and 90 to 92% for cobalt. Normally, in order to obtain this degree of extraction, reaction suspension after chemical attack should present a residual free acid concentration between 30 and 50 g/l.

After leaching, autoclave-derived suspension is depressurized and cooled in expansion chambers (flash vessels), at approximately 212° F. (100° C.), the remaining solids being separated from liquid phase. Solid-liquid separation is performed in decanters operating in countercurrent (CCD), generating a liquor laden with nickel, cobalt, magnesium, manganese, zinc, copper, iron and other metals sulphates. Then, nickel and cobalt present in the liquor are precipitated in the manner of sulphides (by using $H_2S$), carbonates (by using ammonium carbonate) or as hydroxides, by using magnesia—MgO. These intermediate products usually present contents of 55% (Ni+Co) for sulphides (MSP—Mixed Sulphide Precipitate) and 40 to 45% (Ni+Co) in case of hydroxides (MHP—Mixed Hydroxide Precipitate). Recovery of these metals is also possible through solvent extraction directly applied to liquor derived from decantation system. It should be noted that MSP process enables to obtain a product with a higher contents of valuable metals and a lower level of contamination by manganese, magnesium and sulphates. However, production by MSP route involves a high capital cost for auxiliary facilities, once hydrogen and hydrogen sulphite units are necessary, requiring sophisticated security and handling systems for these products.

In the next step—refining—intermediate products (sulphites or nickel and cobalt hydroxide) are re-leached and so, dissolved, they are submitted to purification treatments, such as (i) solvent extraction for nickel and cobalt separation and (ii) electrolysis (electro-refining) aiming to reach higher degrees of purity.

In nickel production process by HPAL route from ore containing silicate and magnesium carbonate, generation of liquid effluent in proportions from 250 to 400 m3/kg of Ni produced takes place, containing essentially magnesium and sulphate, and in a small quantity, cobalt, zinc, manganese, nickel, iron, chromium, among other elements. Table 1 presents chemical composition of the effluent to be treated and shows the significant sulphate and magnesium contents.

TABLE 1

Composition of effluent to be treated

| Components | Unit. | Contents |
|---|---|---|
| Ni | ppm | 2.00 |
| Co | ppm | 6.00 |
| Zn | ppm | 0.90 |
| Mn | ppm | 40.00 |
| Fe | ppm | 10.00 |
| Cr | g/l | 3.45 |

TABLE 1-continued

Composition of effluent to be treated

| Components | Unit. | Contents |
|---|---|---|
| Mg | g/l | 18.00 |
| SO4 | g/l | 75.00 |
| NH3 | g/L | 0.50 |
| pH | | 7.5 |

Effluents treatment process has being exhaustively used to avoid sending-off noxious waste in the environment. Most part of the final product of the effluents treatment has being discharged when it could be reused in the main process or for any other situation in many field. In this sense, U.S. Pat. No. 6,861,041 refers to a method for treating and upgrading effluents containing at least a metallic sulphate. This method comprises steps which consist in: adding at least a base to the effluent to precipitate the metallic ions in the form of metallic hydroxides Mea(OH)e; separating the precipitated hydroxide calcium sulphate CaSO4; and separating the calcium sulphate CaSO4 precipitated during the preceding step. Said method enables to obtain calcium sulphate (white gypsum) substantially free of metals and therefore capable of being upgrade and metallic oxy-hydroxides likewise capable of being upgraded. Even though this process allows removing metallic sulphate from the effluent, the final product of the treatment, the sulphate, is not reused.

Further, GB patent 1346524 discloses a treatment of polluted water that comprises mixing the water with one or more of sulphuric acid, nitric acid and hydrochloric acid to lower the pH of the water to at least 2.5, maintaining this pH for a time sufficient to destroy bacteria present, then bringing the mixture into contact with an acid soluble form of iron for a time sufficient for the iron to react with part of the acid and then raising the pH of the mixture to 7 by the addition of an alkaline solution. During the contact with the acid soluble form of iron, at least one salt selected from the sulphates and nitrates of iron and aluminium, may be present. The mixture of acid and water is preferably contacted with at least 3.2 sq. ft. (0.3 m$^2$) of iron per gallon per minute of acid and water mixture; Ammonium, sodium and potassium hydroxides are suitable alkaline solutions for use in the neutralization step.

SUMMARY OF THE INVENTION

Due to the above mentioned characteristics of the liquid effluent and certain limitations of the current routes for nickel production processing related with effluent treatment methods and reuse of treated water, the present process was developed to recover (i) magnesium and (ii) sulphur. The former, in order to be recycled in the own nickel extraction hydrometallurgical process, for agricultural purposes (correctives and fertilizers) and as raw material for industry in general. The latter, in form of calcium sulphate and/or ammonium sulphate (SAM), used as agricultural corrective and nitrogenous fertilizer, respectively.

Additionally, this process enables to remove remaining metals in the liquid effluent, such as Mn, Zn, Co, Cu, among others, which allows (i) a significant improvement in quality of water, thereby creating conditions for its full recycling in industrial processes and (ii) enables an additional production of micronutrients for agricultural purposes, among others.

The main characteristics of the present process are:

a) use of ammonia, an easily recyclable substance generating alkaline conditions, recovery and improvement in valuable co-products;

b) use of quicklime (CaO) as a supplementary heat generator and sulphate fixation agent ($CaSO_4.2H_2O$, dihydrate gypsum);

c) removal of metal remaining in liquid effluent (Co, Mn, Ni, Zn, Cu, etc.) and improvement thereof as raw material in production of micronutrients for agricultural purposes;

d) removal of soluble magnesium, derived from nickeliferous laterite acid solubilization, in the form of precipitated $Mg(OH)_2$ and its change into magnesium (MgO) for purposes of reuse in the own nickel extraction process and as raw material for agricultural and industrial purposes;

e) removal of sulphate ($SO_4^{-2}$) in the form of (i) ammonium sulphate (SAM)—$(NH_4)_2SO_4$— and/or (ii) calcium sulphate —$CaSO_4.2H_2O$—, for agricultural and industrial purposes as well;

f) change of liquid effluent into water with a sufficient degree of purity for industrial purposes, thereby providing operations in condition of "zero effluent", with a significant reduction in consumption of replacement water in industrial complex;

g) this process, in addition to significantly reduce environmental impact of industrial operations, provides (i) reduction of $CO_2$ emissions and (ii) an increase in use of the other nickel-related mineral resources;

h) moreover, this liquid effluent treatment process presents a wide operating flexibility and can be implemented in a modular manner.

PREFERRED EMBODIMENT OF THE INVENTION

Figure 1:
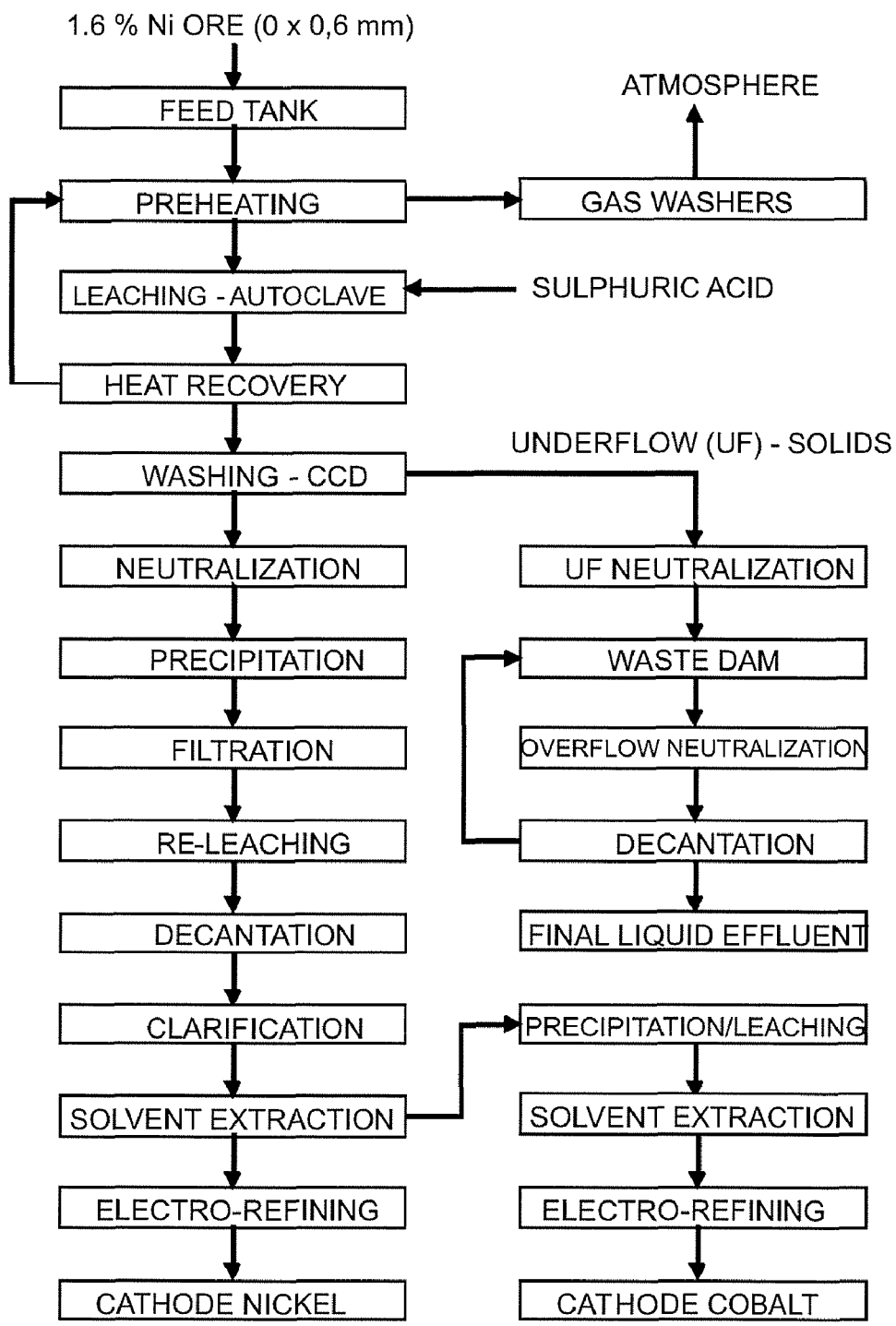
FIG. 1 is a schematic diagram of nickel production process by the prior art HPAL process.
Figure 2:
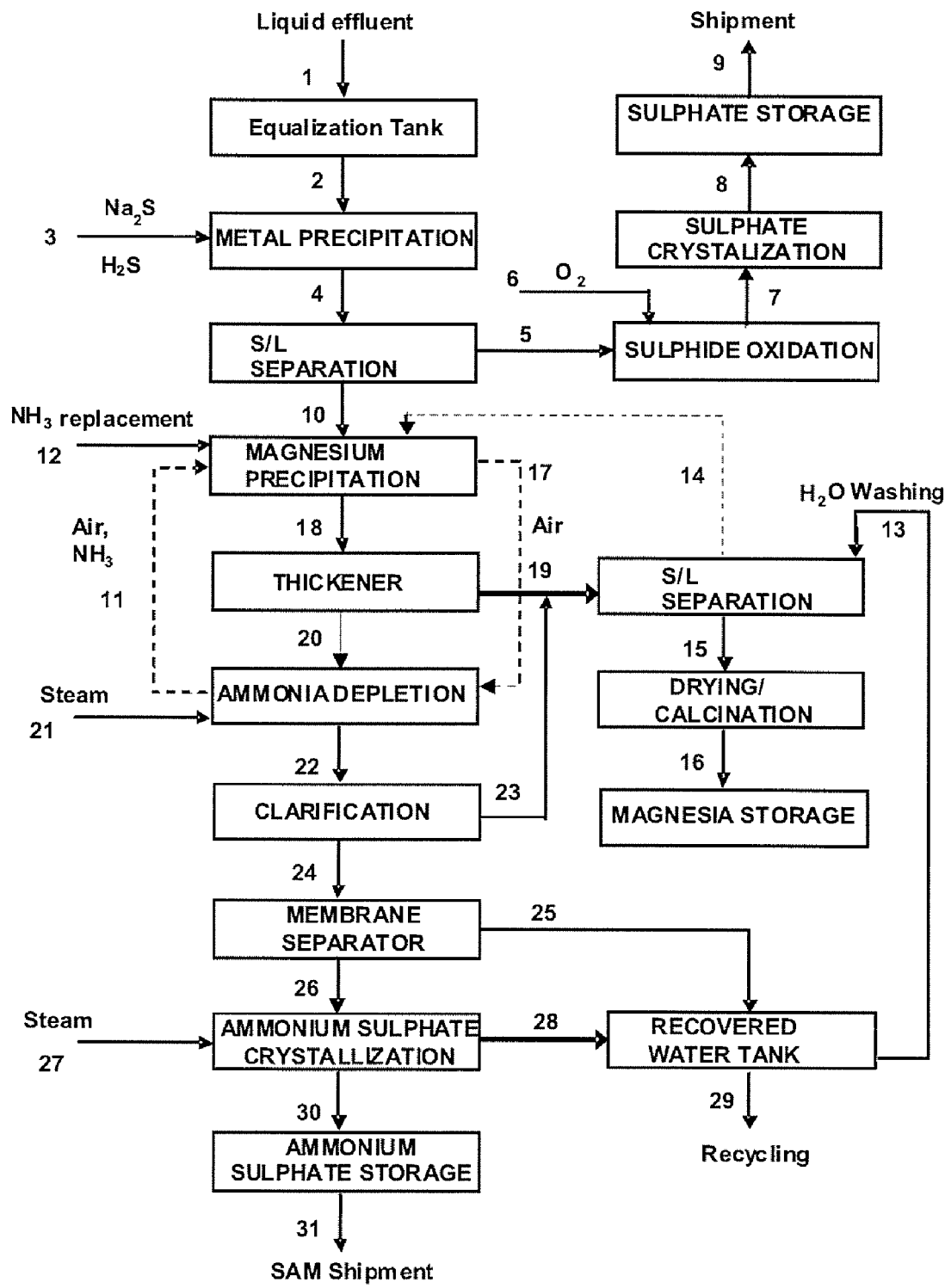
FIG. 2 is a schematic diagram of liquid effluent treatment process according to Route I.
Figure 3:
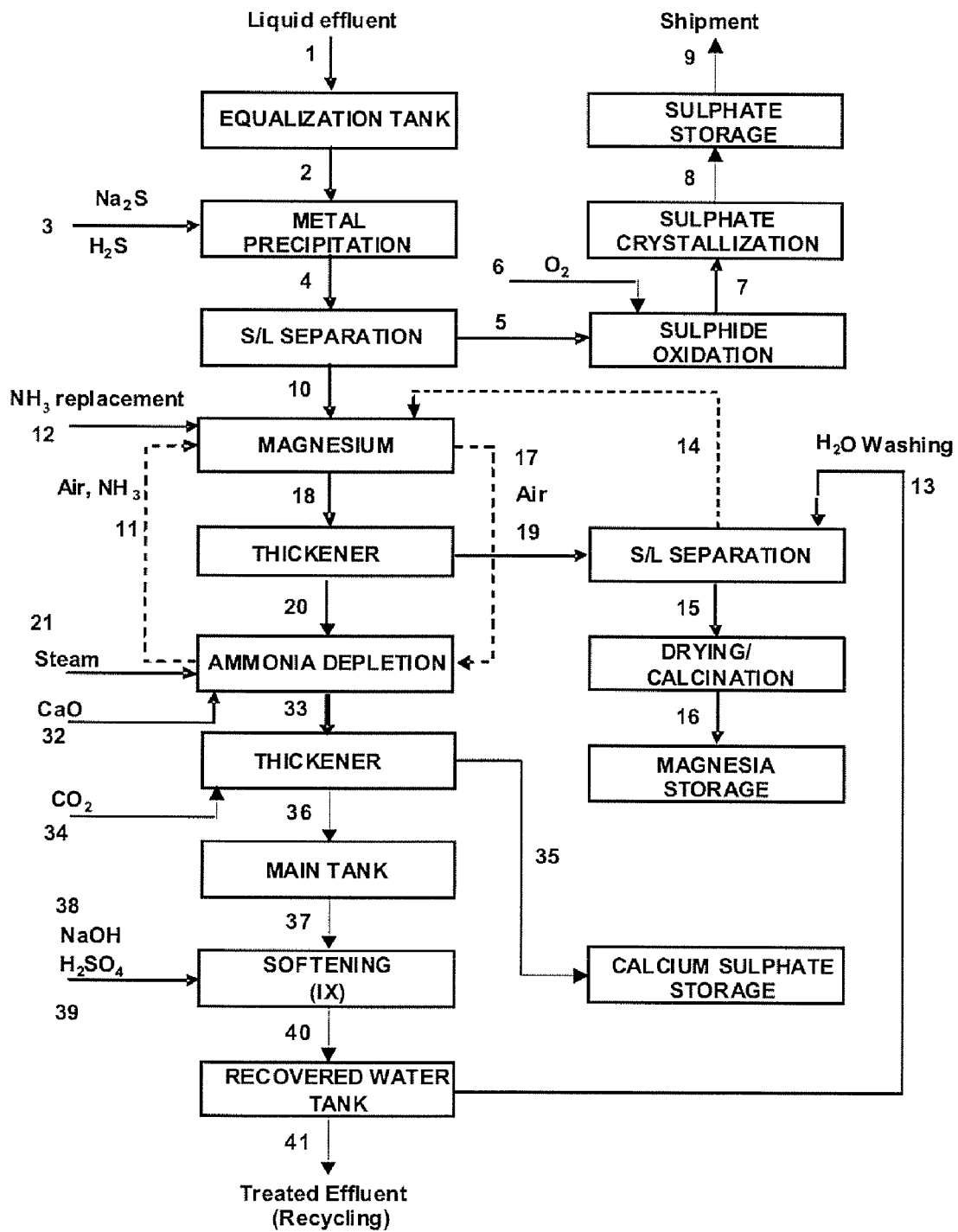
FIG. 3 is a schematic diagram of liquid effluent treatment process according to Route II.

FIGS. 2 and 3 show the two modalities of operation for the effluent treatment process (Route I and Route II) under the present invention patent. The effluent treatment unit, in view of its flexibility, contemplates the two routes mentioned (I and II), and may further operate by direct neutralization of the effluent, with as quicklime (CaO), thereby resulting in a precipitate containing $CaSO_4.2H_2O$, $Mg(OH)_2$ and $MgCO_3$, which can be stored for subsequent use in the agricultural area.

In Route I (FIG. 2), the liquid effluent (1) is received in agitated tanks for equalization. Then, the homogenized effluent (2) receives additions of sulphides (3)—in the form of $Na_2S$ and/or $H_2S$—for precipitation of remaining metals— Ni, Co, Mn, Zn, Cu, among others—in the form of metallic sulphides (4). In the subsequent step, metallic sulphides are submitted to a solid-liquid separation step, resulting in a current plenty of metallic sulphides (5). Washed in a suitable manner, sulphides are oxidized in oxygen injection-agitated reactors (6) and the resulting solution (7) is submitted to crystallization aimed towards obtainment of the respective salts (8), either fractioned or mixed, which are stored and sent to shipment (9).

The liquid effluent treated in this way and practically metal-free (10) is transferred to a reaction system, composed by agitated tanks and tray columns, where it is contacted with replacement ammonia (12), recovered ammonia gaseous current (11) and a weak ammoniacal solution (14) from washing of precipitated magnesium hydroxide (19), resulting the precipitated magnesium hydroxide suspension. This suspension is transferred to a thickener to improve the solids contents and decrease the solid/liquid separation step and then to a solid/liquid separation in order to decrease the quantity of water for the step of dry and calcinations with an economic consumption of energy.

Washed magnesium hydroxide (15) is transferred to drying and calcination, resulting in the obtainment of magnesia (16) which is stored, a part of which being recycled to the nickel extraction process and the remaining part commercialized.

In the reaction system, pH of the precipitation is kept within the range between 9 and 11 and the ammonia concentration between 20 and 150 g/L of $NH_3$. The temperature is between 60° C. and 100° C., the solid quantity is between 1.5% and 15% w/w and the residence time can vary from 0.5 to 2 hours.

Part of precipitated magnesium hydroxide suspension circulates again to the contacting reactors in order to promote growth of Mg (OH)$_2$ crystals by means of seeds, by the ratio of 1:1 until 15:1.

Gaseous current leaving precipitation reactors (17) is transferred to the ammonia depletion system and, together with the addition of low pressure steam (21)—2 to 6 kgf/cm$^2$ man.—free ammonia contained in the effluent without magnesium (20)—liquid phase of solid-liquid separation of Mg(OH)$_2$—is removed in a depletion operation that takes place in a multiple stages depletion column, counter-flow, with a low pressure steam/air mixture, preferably between 2 to 6 kgf/cm$^2$. The free ammonia is recovered and transferred to the magnesium precipitation system. The effluent so treated (22) presents about 0 to 1 g/L free $NH_3$ and about 15 to 30 g/L total $NH_3$.

Liquid effluent resulting from ammonia depletion (22) contains approximately 90 to 140 g/L ammonium sulphate (SAM)—(NH$_4$)$_2$SO$_4$—in solution. In these conditions, the liquid effluent is submitted to clarification for removal of suspended solids remaining in the supernatant phase (23), resulting in a clarified (24). After the clarification the solution is concentrated through membranes—operations of microfiltering, ultrafiltering, nanofiltering, and reverse osmosis—or electrodialysis, resulting in a recovered water current (25) and another saline solution current (26), containing about 200 to 450 g/L of dissolved (NH$_4$)$_2$SO$_4$.

This saline solution (26) is then fed in an evaporation-crystallization system, with a number of steps ranging from 3 to 6, receiving low pressure steam (27). Removal of water derived from evaporation process promotes crystallization of ammonium sulphate (30), which is centrifuged, dried, stored and shipped (31) at the end. Crystallized ammonium sulphate presents a purity ranging from 94 to 97%, which leads to products with medium nitrogen and sulphur contents of the order from 20% and 23%, respectively.

Recovered water (28) in evaporation-crystallization unit is sent to recovered water storage tank, together with recovered water current (25) of the membrane treatment unit, to be reused during nickel industrial processing (13, 29).

Oscillations in ammonium sulphate demand caused by variations in the fertilizer market can be compensated with variations in storage of this product.

However, should that condition become more evident, Route II (FIG. 3), together with the magnesium precipitation process, allow fixation of sulphate with quicklime (32), thus generating a suspension of dihydrate calcium sulphate (33)—CaSO$_4$.2H$_2$O—which is densified in a thickener and pumped (35) to the gypsum storage stack (Stack I). This route II should be used when there is a rigorous reduction in the ammonium sulphate demand in the market. In this case, the lime is added after the magnesium hydroxy precipitation for converting of ammonium sulphate in calcium sulphate and consequently liberating the ammonia and its return to the process. The densification of the calcium sulphate is necessary to decrease the period of solid/liquid step.

Should the precipitation system of magnesium hydroxide with ammonia be out of operation, neutralization of effluent, as well as sulphate and magnesium precipitation can be performed by adding quicklime and carbon dioxide (34), resulting in a mixed gypsum precipitate, magnesium and calcium hydroxides and carbonates (35'), which should be stored apart (Stack II). In this case, the thickener supernatant (36) goes to a main tank and therefrom (37) to the softening unit with ionic exchange resins—IX, regenerated with salts or alkalis (38) and acids (39). Resulting softened water (40) is transferred to a recovered water tank and recycled therefrom in the nickel extraction process (41).

Thus, by coupling Routes I and II, a flexibility is created to absorb variations (i) in generation of liquid effluent, due to pluviometric system in industrial complex, and (ii) seasonality of demand of byproducts resulting from treatment: ammonium sulphate, agricultural gypsum and micronutrients.

EXAMPLE

Simulation tests of the process under the present patent performed in laboratory scale showed the possibility to obtain byproducts (solids, recyclable) with business value and recovered water with proper quality for reuse in industrial process, which allows to reach the condition of zero effluent as to liquid effluent emissions. Table 2 shows evolution of quality of liquid effluent in the course of treatment process under the present patent.

TABLE 2

Evolution of quality of the effluent along the treatment process

| Components | Unit | Effluent Just as | After Me$^{+n}$ precipitated | After Mg precipitated | After SAM crystallized |
|---|---|---|---|---|---|
| Ni | mg/L | 2.00 | <0.5 | <0.5 | <0.5 |
| Co | mg/L | 6.00 | <0.5 | <0.5 | <0.5 |
| Zn | mg/L | 0.90 | 0.90 | 0.90 | 0.90 |
| Mn | mg/L | 40.00 | 9.00 | 9.00 | 0.10 |
| Fe | mg/L | 10.00 | 0.30 | 0.30 | 0.30 |
| Cr | mg/L | 3,450.00 | 0.05 | 0.05 | 0.05 |
| Mg | mg/L | 18,000.00 | 18,000.00 | 1,555.20 | 62.50 |
| SO4 | mg/L | 75,000.00 | 75,000.00 | 75,000.00 | 250.00 |
| NH3 | mg/L | 500.00 | 500.00 | 120,000.00 | nd |
| pH |  | 7.5 | — | 10.6 | 7.0 |

As byproducts, the following have been obtained: (i) magnesium oxide (MgO), with a proper quality for reuse in nickel extraction process, (ii) metallic sulphides, as raw material for obtainment of agricultural micronutrients, (iii) dihydrate gypsum, also for agricultural purposes and (iv) saline solution containing ammonia sulphate in solution, proper for evaporation and crystallization purposes.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

What is claimed is:

1. A liquid and solid effluents treatment process for nickel extraction comprising the following steps:
   A) removal of nickel and other metals including Mn, Co, Cu and Zn from the liquid effluent by sulphides addition,
   B) magnesium hydroxide precipitation from the liquid effluent through the addition of ammonia and obtainment of magnesia via calcination of the magnesium hydroxide,
   C) depletion and removal of free ammonia from the liquid effluent, and
   D) crystallization and extraction of ammonium sulphate from the depleted liquid effluent.

2. The process according to claim 1 wherein the liquid and solid effluents are derived from nickel production processes.

3. The process according to claim 1 wherein before step (A) a liquid effluent equalization step takes place.

4. The process according to claim 1 wherein in step (A) precipitation occurs of metals as sulphides, oxidation of metallic sulphides and crystallization as metallic sulfates.

5. The process according to claim 1 wherein in step (B), magnesium is precipitated as magnesium hydroxide by means of addition of ammonia in a quantity between about 20 g/L to 150 g/L.

6. The process according to claim 5 wherein step (B) presents a pH from about 9 to 11, temperature from about 60° C. and 100° C., solid contents from about 1.5% to 15% w/w and residence time from 0.5 to 2 hours.

7. The process according to claim 1 wherein in step (B) a wash of magnesium hydroxide precipitated takes place, followed by a drying and calcinations resulting in magnesia.

8. The process according to claim 1 wherein in step (C) the removal of free ammonia takes place in a multistage depletion column, in countercurrent, with a low pressure air/steam mixture preferably from about 2 kgf/cm$^2$ to 6 kgf/cm$^2$.

9. The process according to claim 8 wherein at the end of step (C) the liquid effluent comprises from about 90 g/L to 140 g/L of ammonium sulphate in solution.

10. The process according to claim 1 wherein after step (C) the liquid effluent is submitted to a clarification for removal of suspended solids.

11. The process according to claim 10 wherein after the clarification the solution is concentrated through membranes in operation of microfiltering, ultrafiltering, nanofiltering and reverse osmosis resulting in a recovered water current and in a saline solution current comprising from about 200 g/L to 450 g/L of ammonium sulphate.

12. The process according to claim 11 wherein the ammonium sulphate is submitted to a crystallization through low pressure steam resulting in the water removal and ammonium sulphate crystallization.

13. The process according to claim 12 wherein after the crystallization the ammonium sulphate is centrifuged, dried, stored and shipped.

14. The process according to claim 12 wherein water recovered from the crystallization step is stored with the recovered water of the membrane concentration step to be reused in nickel industrial processing.

15. A liquid and solid effluents treatment process for nickel extraction comprising the following steps:
   A) removal of nickel and other metals including Mn, Co, Cu and Zn from the liquid effluent by sulphides addition,
   B) magnesium hydroxide precipitation from the liquid effluent through the addition of ammonia and obtainment of magnesia via calcination of the magnesium hydroxide,
   C) depletion and removal of free ammonia from the liquid effluent, and
   D) extraction of ammonium sulphate from the depleted liquid effluent through an addition of quicklime.

16. The process according to claim 15 wherein the liquid effluents are derived from nickel production processes.

17. The process according to claim 15 wherein before step (A) liquid effluent equalization step takes place.

18. The process according to claim 15 wherein in step (A) occurs the precipitation of metals as sulphides, oxidation of metallic sulphides and crystallization as metallic sulfates.

19. The process according to claim 15 wherein in step (B), magnesium is precipitated as magnesium hydroxide by means of addition of ammonia in a quantity between about 20 g/L to 150 g/L.

20. The process according to claim 19 wherein step (B) presents a pH from about 9 to 11, temperature from about 60° C. and 100° C., solid contents from about 1.5% to 15% w/w and residence time from about 0.5 to 2 hours.

21. The process according to claim 15 wherein in step (B) a wash of magnesium hydroxide precipitated takes place, followed by a drying and calcinations resulting in magnesia.

22. The process according to claim 15 wherein in step (C) the removal of free ammonia takes place in a multistage depletion column, in countercurrent, with a low pressure air/steam mixture preferably from about 2 kgf/cm$^2$ to 6 kgf/cm$^2$.

23. The process according to claim 22 wherein at the end of step (C) the liquid effluent comprises from about 90 g/L to 140 g/L of ammonium sulphate in solution.

24. The process according to claim 15 wherein after step (D) the ammonium sulphate of the effluent is precipitated through the addition of quicklime generating a suspension of dehydrate calcium sulphate which is densified in a thickener and pumped to a gypsum storage stack.

25. The process according to claim 24 wherein supernatant from the thickener goes to a main tank and therefrom to a softening unit with an ionic exchange resins.

26. The process according to claim 25 wherein water recovered from the softening unit is stored to be reused in nickel industrial processing.

* * * * *